US011444921B2

(12) United States Patent
Park et al.

(10) Patent No.: US 11,444,921 B2
(45) Date of Patent: Sep. 13, 2022

(54) VEHICULAR FIREWALL PROVIDING DEVICE

(71) Applicant: LG ELECTRONICS INC., Seoul (KR)

(72) Inventors: Junsang Park, Seoul (KR); Youngil Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 252 days.

(21) Appl. No.: 16/500,690

(22) PCT Filed: Jul. 16, 2019

(86) PCT No.: PCT/KR2019/008781

§ 371 (c)(1),
(2) Date: Oct. 3, 2019

(87) PCT Pub. No.: WO2021/010515

PCT Pub. Date: Jan. 21, 2021

(65) Prior Publication Data

US 2021/0297388 A1    Sep. 23, 2021

(51) Int. Cl.
*H04L 9/40* (2022.01)
*H04L 49/505* (2022.01)

(52) U.S. Cl.
CPC ........ *H04L 63/0263* (2013.01); *H04L 63/101* (2013.01); *H04L 63/1416* (2013.01); *H04L 49/505* (2013.01)

(58) Field of Classification Search
None
See application file for complete search history.

(56) References Cited

U.S. PATENT DOCUMENTS

| | | | |
|---|---|---|---|
| 6,314,351 B1 * | 11/2001 | Chutorash | H04L 63/10 307/10.1 |
| 9,369,434 B2 * | 6/2016 | Kim | H04L 63/0227 |
| 2003/0051165 A1 * | 3/2003 | Krishnan | H04L 63/0263 726/4 |
| 2009/0082912 A1 * | 3/2009 | Melman | B60T 8/885 701/1 |
| 2009/0172800 A1 * | 7/2009 | Wool | G06F 21/604 726/11 |
| 2010/0318794 A1 * | 12/2010 | Dierickx | B60R 25/04 726/5 |
| 2016/0036838 A1 * | 2/2016 | Jain | H04L 67/10 726/23 |
| 2020/0274851 A1 * | 8/2020 | Qiao | H04L 63/0263 |

* cited by examiner

*Primary Examiner* — Joseph P Hirl
*Assistant Examiner* — Hassan Saadoun
(74) *Attorney, Agent, or Firm* — Birch, Stewart, Kolasch & Birch, LLP

(57) ABSTRACT

A vehicular firewall providing device includes a processor configured to match a data packet received from an external device and a plurality of rules at a set order, and to perform rule reordering defined to change the order based on a matching result. The processor is further configured to perform the rule reordering after the state, in which the vehicle autonomously travels, is terminated, upon detecting a hacking attack sign in a state in which a vehicle autonomously travels.

17 Claims, 9 Drawing Sheets

10

100

100

VEHICULAR FIREWALL PROVIDING DEVICE

CROSS REFERENCE TO RELATED APPLICATIONS

This application is the National Phase of PCT International Application No. PCT/KR2019/008781, filed on Jul. 16, 2019, which is hereby expressly incorporated by reference into the present application.

TECHNICAL FIELD

The present invention relates to a vehicular firewall providing device.

BACKGROUND ART

A vehicle is an apparatus that is moved in a desired direction by a user who rides therein. A representative example of a vehicle is an automobile. An autonomous vehicle is a vehicle that autonomously travels without driving manipulation of a human.

A communication device of an autonomous vehicle exchanges a data packet with an external device (e.g., a server or other vehicles). When data is exchanged, there may be hacking attack. To this end, a vehicle requires a firewall providing device.

A conventional firewall complies with several ten thousands of rules or more, and thus there is a problem in that overload is caused in data processing. When overload is caused in data processing, a data packet processing rate may be delayed. The problem may also affect driving performance of an autonomous vehicle.

DISCLOSURE

Technical Problem

It is an object of the present invention to provide a vehicular firewall providing device for effectively defending hacking attack while overload is not caused in data packet processing.

The technical problems solved by the embodiments are not limited to the above technical problems, and other technical problems which are not described herein will become apparent to those skilled in the art from the following description.

Technical Solution

In accordance with the present invention, the above and other objects can be accomplished by the provision of a vehicular firewall providing device including a processor configured to match a data packet received from an external device and a plurality of rules at a set order, and to perform rule reordering defined to change the order based on a matching result.

Details of other embodiments are included in a detailed description and drawings.

Advantageous Effects

According to the above technical solution, the present invention may provide one or more of the following effects.

First, a time used to search for a rule may be reduced via effective rule reordering.

Second, a packet processing rate may be increased, thereby increasing processing power.

The effects of the present invention are not limited to the above-described effects and other effects which are not described herein may be derived by those skilled in the art from the following description of the embodiments of the disclosure.

BEST MODE

Reference will now be made in detail to the exemplary embodiments of the present invention, examples of which are illustrated in the accompanying drawings. The suffixes "module" and "unit" of elements herein are used for convenience of description and thus can be used interchangeably, and do not have any distinguishable meanings or functions. In the following description of the at least one embodiment, a detailed description of known functions and configurations incorporated herein will be omitted for the purpose of clarity and for brevity. The features of the present invention will be more clearly understood from the accompanying drawings and should not be limited by the accompanying drawings, and it is to be appreciated that all changes, equivalents, and substitutes that do not depart from the spirit and technical scope of the present invention are encompassed in the present invention.

It will be understood that, although the terms "first", "second", "third" etc. may be used herein to describe various elements, these elements should not be limited by these terms. These terms are only used to distinguish one element from another element.

It will be understood that when an element is referred to as being "on", "connected to" or "coupled to" another element, it may be directly on, connected or coupled to the other element, or intervening elements may be present. In contrast, when an element is referred to as being "directly on," "directly connected to" or "directly coupled to" another element or layer, there are no intervening elements present.

The singular expressions in the present specification include the plural expressions unless clearly specified otherwise in context.

It will be further understood that the terms "comprises" or "comprising" when used in this specification specify the presence of stated features, integers, steps, operations, elements, or components, but do not preclude the presence or addition of one or more other features, integers, steps, operations, elements, components, or groups thereof.

Figure 1:
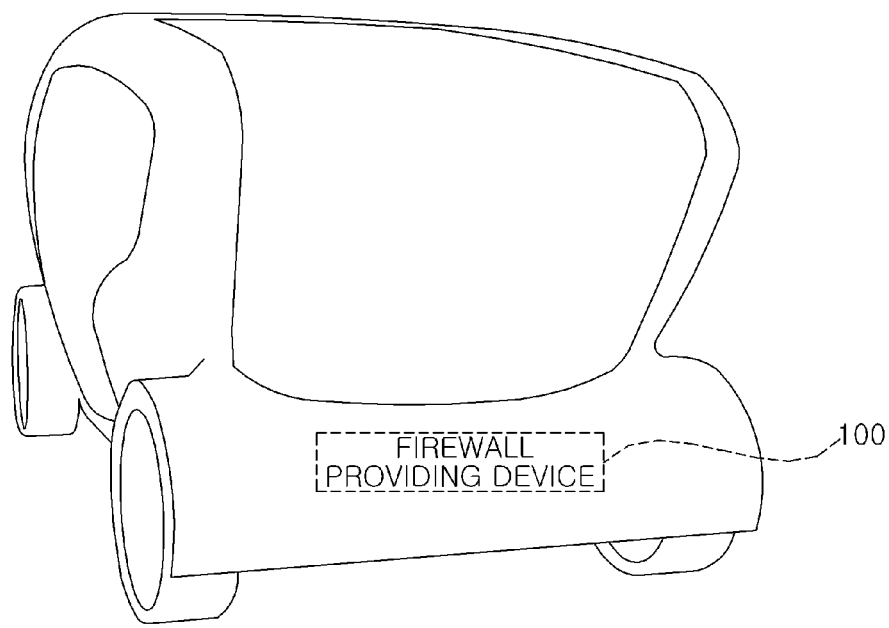
FIG. 1 is a diagram showing an outer appearance of a vehicle according to an embodiment of the present invention.
Figure 1:
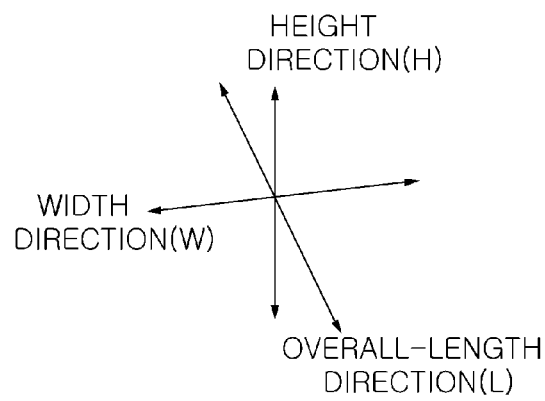

FIG. 1 is a diagram showing a vehicle according to an embodiment of the present invention.

Referring to FIG. 1, a vehicle 10 according to an embodiment of the present invention may be defined as a transportation device that travels on a road or a railroad. The vehicle 10 may conceptually include an automobile, a train, and a motorcycle. The vehicle 10 may include a vehicle equipped with an internal combustion engine as a power source, a hybrid vehicle equipped with both an engine and an electric motor as a power source, and an electric vehicle equipped with an electric motor as a power source. The vehicle 10 may be a sharing vehicle. The vehicle 10 may be an autonomous vehicle.

The vehicle 10 may include an advertisement providing device 100.

The vehicle 10 may interact with at least one robot. The robot may be an autonomous mobile robot (AMR) that autonomously travels. The AMR is autonomously moveable and freely moves, and includes a plurality of sensors for avoiding an obstacle or the like while traveling. The AMR may be a flight type robot (e.g., a drone) including a flight device. The AMR may be a wheel type robot that includes at least one wheel and moves via rotation of the wheel. The AMR may be a leg type robot that includes at least one leg and moves using the leg.

A robot may function as a device for providing convenience of a user of the vehicle 10. For example, the robot may move a load on the vehicle 10 to a final destination of a user. For example, the robot may guide a road to a final destination to the user who exits from the vehicle 10. For example, the robot may transfer a user who exits from the vehicle 10 to a final destination.

At least one electronic device included in a vehicle may communicate with a robot through a communication device 220.

At least one electronic device included in a vehicle may provide, to the robot, data processed by at least one electronic device included in the vehicle. For example, the at least one electronic device included in the vehicle may provide, to the robot, at least one of object data, HD map data, vehicle state data, vehicle position data, or driving plan data.

The at least one electronic device included in the vehicle may receive data processed by the robot, from the robot. The at least one electronic device included in the vehicle may receive at least one of sensing data generated by the robot, object data, robot state data, robot position data, or robot moving plan data.

The at least one electronic device included in the vehicle may generate a control signal in further consideration of the data received from the robot. For example, the at least one electronic device included in the vehicle may compare information on an object generated by an object detection device 210 with information on an object generated by a robot and may generate a control signal based on the comparison result. The at least one electronic device included in the vehicle may generate a control signal to prevent interference between a moving route of the vehicle 10 and a moving route of the robot.

The at least one electronic device included in the vehicle may include a software module or a hardware module (hereinafter, an AI module) which implements artificial intelligence (AI). The at least one electronic device included in the vehicle may input the acquired data to the AI module and may use data output from the AI module.

The AI module may perform machine learning on input data using at least one artificial neural network (ANN). The AI module may output the driving plan data by performing machine learning on the input data.

The at least one electronic device included in the vehicle may generate a control signal based on the data output from the AI module.

In some embodiments, the at least one electronic device included in the vehicle may receive data processed by AI from an external device through the communication device 220. The at least one electronic device included in the vehicle may generate a control signal based on the data processed by AI.

Figure 2:
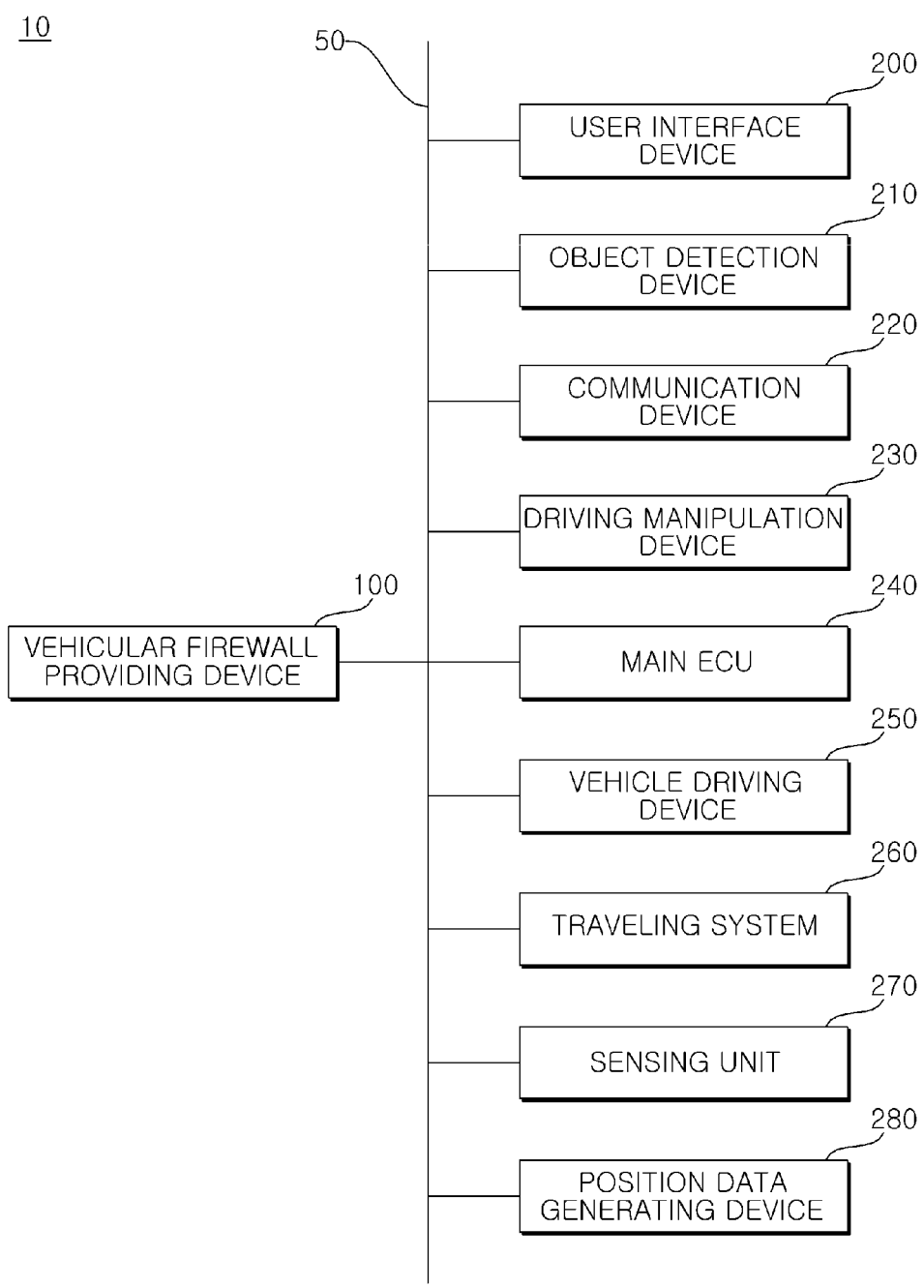
FIG. 2 is a control block diagram of a vehicle according to an embodiment of the present invention.

FIG. 2 is a control block diagram of a vehicle according to an embodiment of the present invention.

Referring to FIG. 2, the vehicle 10 may include the vehicular firewall providing device 100, a user interface device 200, an object detection device 210, a communication device 220, a driving manipulation device 230, a main electronic control unit (ECU) 240, a vehicle driving device 250, a traveling system 260, a sensing unit 270, and a position data generating device 280.

The vehicular firewall providing device 100 may be understood as an electronic device included in the vehicle 10. The vehicular firewall providing device 100 may be classified as a lower-ranking component of the communication device 220. In some embodiments, the vehicular firewall providing device 100 may be separately configured from the communication device 220. The vehicular firewall providing device 100 may be implemented by installing software in a processor.

The UI device 200 may be used to enable the vehicle 10 to communicate with a user. The UI device 200 may receive user input, and may provide information generated by the vehicle 10 to the user. The vehicle 10 may implement a UI or User Experience (UX) through the UI device 200. The user interface device 200 may be implemented as a display device installed in the vehicle 10, a head up display (HUD) device, a window display device, a cluster device, or the like. The user interface device 200 may include an input device, an output device, and a user monitoring device. The user interface device 200 may include an input device such as a touch input device, a mechanical input device, a voice input device, or a gesture input device. The user interface device 200 may include an output device such as a speaker, a display, or a haptic module. The user interface device 200 may include a user monitoring device such as a driver monitoring system (DMS) or an internal monitoring system (IMS).

The object detection device 210 may detect an object outside the vehicle 10. The object detection device 210 may include at least one sensor for detecting an object outside the vehicle 10. The object detection device 210 may include at least one of a camera, radio detecting and ranging (radar), light detection and ranging (LiDAR), an ultrasonic sensor, or an infrared sensor. The object detection device 210 may provide data of an object, which is generated based on a sensing signal generated by a sensor, to at least one electronic device included in a vehicle.

The camera may generate information on an object outside the vehicle 10 using an image. The camera may include at least one lens, at least one image sensor, and at least one processor that is condutibly connected to the image sensor to process a received signal and generates data of an object based on the processed signal.

The camera may be at least one of a mono camera, a stereo camera, or an around view monitoring (AVM) camera. The camera may acquire information about the location of an object, information about a distance to the object, or information about a relative speed with respect to the object by any of various image processing algorithms. For example, the camera may acquire information about a distance to an object and information about a relative speed with respect to the object in an acquired image, based on a variation in the size of the object over time. For example, the camera may acquire information about a distance to an object and information about a relative speed with respect to the object through a pin hole model, road surface profiling, or the like. For example, the camera may acquire information about a distance to an object and information about a relative speed with respect to the object based on disparity information in a stereo image acquired by a stereo camera.

To acquire an image of the exterior of the vehicle, the camera may be installed to ensure a field of view (FOV) in the vehicle. To acquire an image of the front view of the vehicle, the camera may be disposed in the vicinity of a front windshield inside the vehicle. Alternatively, the camera may be disposed around a front bumper or a radiator grille. To acquire an image of what lies behind the vehicle, the camera may be disposed in the vicinity of a rear glass inside the vehicle. Alternatively, the camera may be disposed around a rear bumper, a trunk, or a tail gate. To acquire an image of what lies on a side of the vehicle, the camera may be disposed in the vicinity of at least one of side windows inside the vehicle. Alternatively, the camera may be disposed around a side view mirror, a fender, or a door.

The RADAR may generate information an object outside the vehicle 10 using an electromagnetic wave. The RADAR may include an electromagnetic wave transmitter, an electromagnetic wave receiver, and at least one processor that is electrically connected to the electromagnetic wave transmitter and the electromagnetic wave receiver, is configured to a received signal, and to generate data of an object based on the processed signal. The RADAR may be implemented by pulse RADAR or continuous wave RADAR according to a radio wave emission principle. The RADAR may be implemented by Frequency Modulated Continuous Wave (FMCW) or Frequency Shift Keying (FSK) according to a signal waveform among the continuous wave radar methods. The RADAR may detect an object in a time of flight (TOF) or phase shifting by electromagnetic waves, and may detect the location, distance, and relative speed of the detected object. The RADAR may be disposed at an appropriate position on the exterior of the vehicle in order to sense an object ahead of, behind, or on a side of the vehicle.

The LiDAR may generate information on an object outside the vehicle 10 using a laser beam. The LiDAR may include an optical transmitter, an optical receiver, and at least one processor that is electrically connected to the optical transmitter and the optical receiver to process a received signal and generates data of an object based on the processed signal. The LiDAR may be implemented using a time of flight (TOF) method or a phase-shift method. The LiDAR may be implemented in a driven or non-driven manner. If the LiDAR is implemented in the driven manner, the LiDAR may be rotated by a motor and detect an object around the vehicle. If the LiDAR is implemented in a non-driven manner, the LiDAR may detect an object within a predetermined range from the vehicle by optical steering. The vehicle may include a plurality of non-driven LiDARs. The LiDAR may detect an object in TOF or phase shifting by laser light, and determine the location, distance, and relative speed of the detected object. The LiDAR may be disposed at an appropriate position on the exterior of the vehicle in order to sense an object ahead of, behind, or on a side of the vehicle.

The communication device 220 may exchange a signal with a device positioned outside the vehicle 10. The communication device 220 may exchange a signal with at least one of an infrastructure element (e.g., a server or a broadcasting station) or other vehicles. The communication device 220 may include at least one of a transmission antenna, a reception antenna, a radio frequency (RF) circuit for implementing various communication protocols, or an RF device for performing communication.

The communication device 220 may communicate with a device outside the vehicle 10 using a 5G (e.g., a new radio (NR)) method. The communication device 220 may implement V2X (V2V, V2D, V2P, and V2N) communication using the 5G method.

The driving manipulation device 230 may be used to receive a user command for driving the vehicle 10. In the manual mode, the vehicle 10 may travel based on a signal provided by the driving manipulation device 230. The driving manipulation device 230 may include a steering input device (e.g., a steering wheel), an acceleration input device (e.g., an acceleration pedal), and a brake input device (e.g., a brake pedal).

The main ECU 240 may control an overall operation of at least one electronic device included inside the vehicle 10.

The vehicle driving device 250 may be a device that electrically controls various vehicle driving devices in the vehicle 10. The vehicle driving device 250 may include a power train driving control device, a chassis driving control device, a door/window driving control device, a safety device driving control device, a lamp driving control device, and an air conditioner driving control device. The power train driving control device may include a power source driving control device and a transmission driving control device. The chassis driving control device may include a steering driving control device, a brake driving control device, and a suspension driving control device.

The safety device driving control device may include a safety belt driving control device for control of safety belt.

The vehicle driving device 250 may also be referred to as a control electronic control unit (ECU).

A traveling system 260 may generate a signal for controlling the movement of the vehicle 10 or for outputting information to a user, based on the data of the object, which is received from the object detection device 210. The traveling system 260 may provide the generated signal to at least one of the user interface device 200, the main ECU 240, or the vehicle driving device 250.

The traveling system 260 may conceptually include an advanced driver assistance system (ADAS). The ADAS 260 may implement at least one of an adaptive cruise control (ACC) system, an autonomous emergency braking (AEB) system, a forward collision warning (FCW) system, a lane keeping assist (LKA) system, a lane change assist (LCA) system, a target following assist (TFA) system, a blind spot detection (BSD) system, a high beam assist (HBA) system, an auto parking system (APS), a PD collision warning system, a traffic sign recognition (TSR) system, a traffic sign assist (TSA) system, a night vision (NV) system, a driver status monitoring (DSM) system, or a traffic jam assist (TJA) system.

The traveling system 260 may include autonomous driving electronic control unit (ECU). The autonomous driving ECU may set an autonomous driving route based on data received from at least one of other electronic devices in the vehicle 10. The autonomous driving ECU may set an autonomous driving route based on data received from at least one of the user interface device 200, the object detection device 210, the communication device 220, the sensing unit 270, or the position data generating device 280. The autonomous driving ECU may generate a control signal to enable the vehicle 10 to travel along an autonomous driving route. The control signal generated by the autonomous driving ECU may be provided to at least one of the main ECU 240 or the vehicle driving device 250.

The sensing unit 270 may sense a vehicle state. The sensing unit 270 may include at least one of an inertial navigation unit (IMU) sensor, a collision sensor, a wheel sensor, a speed sensor, an inclination sensor, a weight detection sensor, a heading sensor, a position module, a vehicle drive/reverse sensor, a battery sensor, a fuel sensor, a tire sensor, a steering sensor for rotation of the steering wheel, an in-vehicle temperature sensor, an in-vehicle humidity sensor, an ultrasonic sensor, an illuminance sensor, an acceleration pedal position sensor, or a brake pedal position sensor. The inertial navigation unit (IMU) sensor may include one or more of an acceleration sensor, a gyro sensor, and a magnetic sensor.

The sensing unit 270 may generate state data of a vehicle based on a signal generated by at least one sensor. The sensing unit 270 may acquire a sensing signal of vehicle position information, vehicle motion information, vehicle yaw information, vehicle roll information, vehicle pitch information, vehicle collision information, vehicle heading information, vehicle angle information, vehicle speed information, vehicle acceleration information, vehicle inclination information, vehicle drive/reverse information, battery information, fuel information, wheel information, vehicle lamp information, vehicle internal temperature information, vehicle internal humidity information, a steering wheel rotation angle, a vehicle external illuminance, the pressure applied to an accelerator pedal, the pressure applied to a brake pedal, and so on.

The sensing unit 270 may further include an accelerator pedal sensor, a pressure sensor, an engine speed sensor, an air flow sensor (AFS), an air temperature sensor (ATS), a water temperature sensor (WTS), a throttle position sensor (TPS), a top dead center (TDC) sensor, a crank angle sensor (CAS), and so on.

The sensing unit 270 may generate vehicle state information based on the sensing data. The vehicle state information may be generated based on data detected by various sensors included in the vehicle.

For example, the vehicle state information may include vehicle position information, vehicle speed information, vehicle inclination information, vehicle weight information, vehicle heading information, vehicle battery information, vehicle fuel information, vehicle wheel air pressure information, vehicle steering information, in-vehicle temperature information, in-vehicle humidity information, pedal position information, vehicle engine temperature information, and so on.

The sensing unit may include a tension sensor. The tension sensor may generate a sensing signal based on a tension state of a safety belt.

The position data generating device 280 may generate position data of the vehicle 10. The position data generating device 280 may include at least one of a global positioning system (GPS) or a differential global positioning system (DGPS). The position data generating device 280 may generate position data of the vehicle 10 based on a signal generated by at least one of a GPS or a DGPS. In some embodiments, the position data generating device 280 may correct the position data based on at least one of an inertial measurement unit (IMU) of the sensing unit 270 or a camera of the object detection device 210.

The position data generating device 280 may be referred to as a position displacement device. The position data generating device 280 may be referred to as a global navigation satellite system (GNSS).

The vehicle 10 may include an internal communication system 50. A plurality of electronic devices included in the vehicle 10 may exchange signals using the internal communication system 50 as a medium. The signals may include data. The internal communication system 50 may use at least one communication protocol (e.g., CAN, LIN, FlexRay, MOST, or Ethernet).

Figure 3:
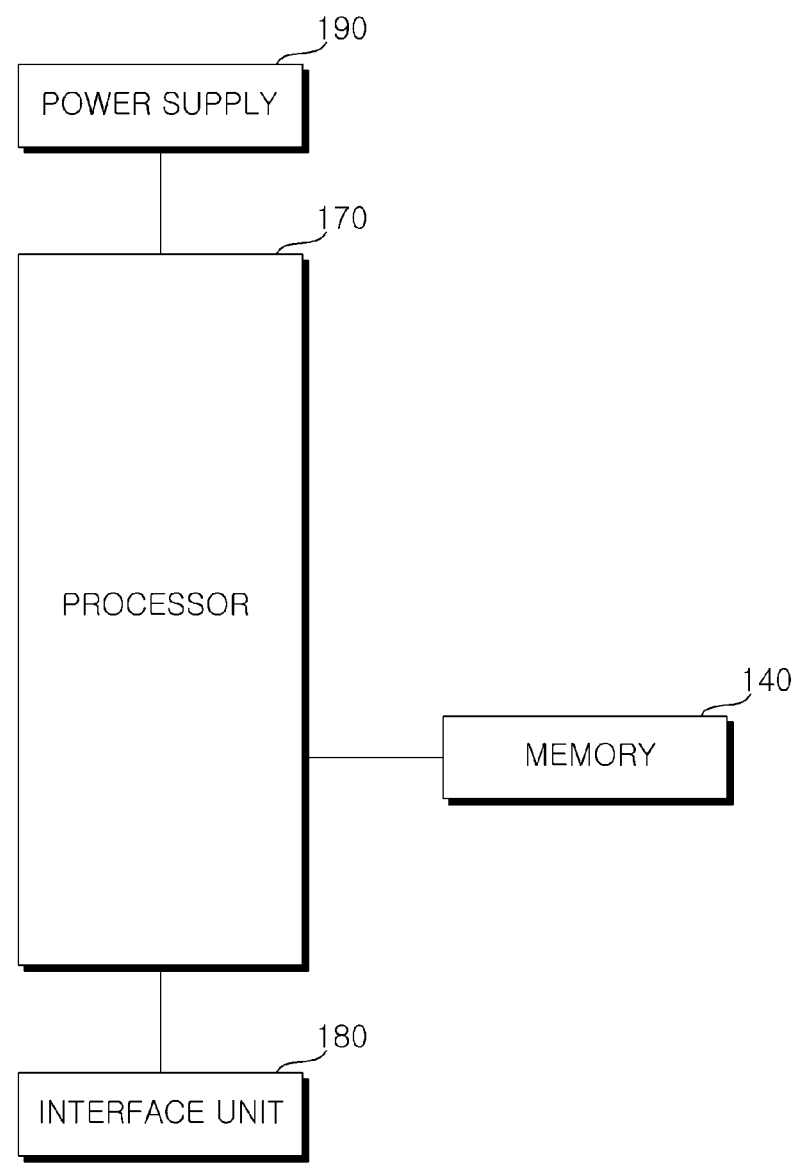
FIG. 3 is a control block diagram of an electronic device according to an embodiment of the present invention.

FIG. 3 is a control block diagram of an electronic device according to an embodiment of the present invention.

Figure 4:
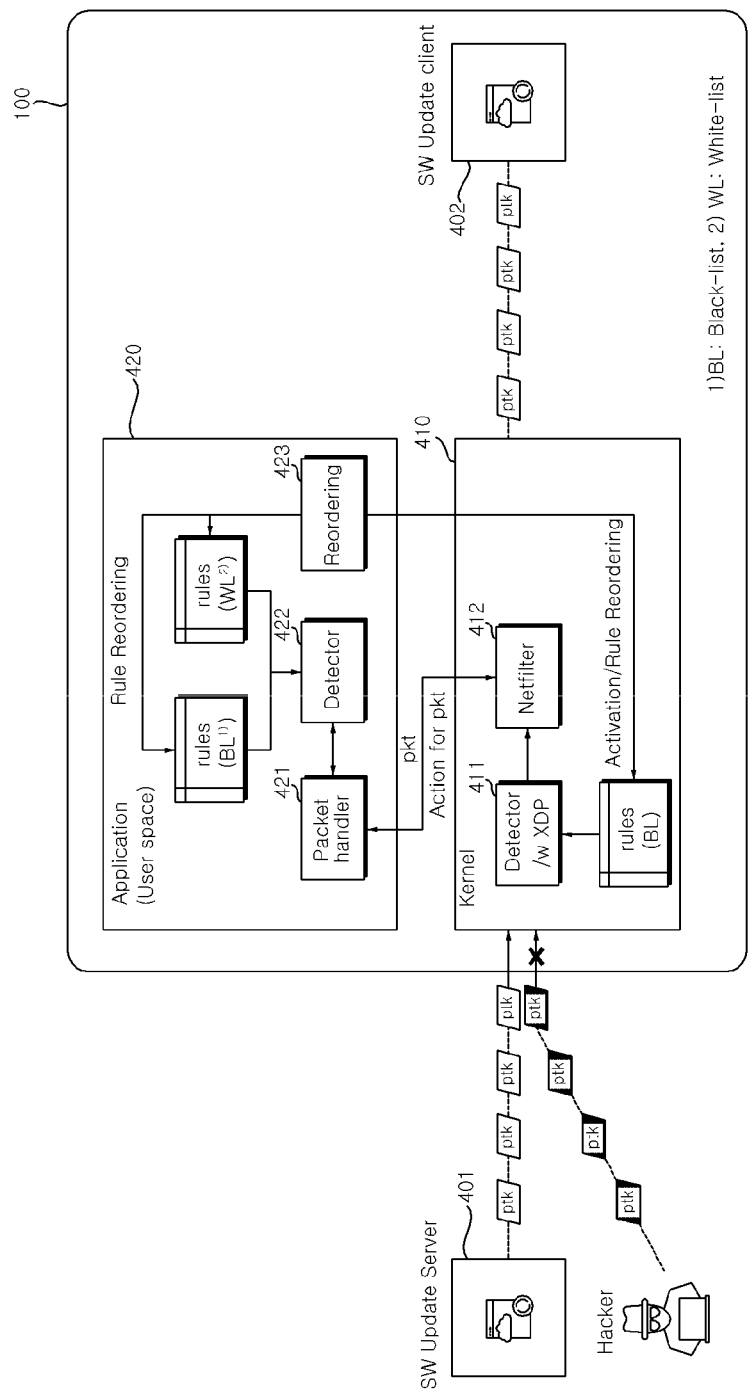
FIG. 4 is a diagram for explanation of a vehicular firewall providing device according to an embodiment of the present invention.

FIG. 4 is a diagram for explanation of a vehicular firewall providing device according to an embodiment of the present invention.

Referring to the drawings, the vehicular firewall providing device 100 may include a memory 140, a processor 170, an interface unit 180, and a power supply 190.

The memory 140 may be electrically connected to the processor 170. The memory 140 may store basic data of a predetermined unit, control data for control of an operation of a predetermined unit, and input and output data. The memory 140 may store data processed by the processor 170. The memory 140 may include at least one of a read-only memory (ROM), random-access memory (RAM), erasable programmable read only memory (EPROM), flash drive, or hard drive in terms of hardware. The memory 140 may store various data for an overall operation of the vehicular firewall providing device 100, such as a program for processing or controlling the processor 170. The memory 140 may be integrated into the processor 170. In some embodiments, the memory 140 may be classified as a lower-ranking component of the processor 170.

The interface unit 180 may exchange signals with the at least one electronic device included in the vehicle 10 in a wired or wireless manner. The interface unit 180 may exchange signals with at least one of the user interface device 200, the object detection device 210, the communication device 220, the driving manipulation device 230, the main ECU 240, the vehicle driving device 250, the traveling system 260, the sensing unit 270, or the position data generating device 280 in a wired or wireless manner. The interface unit 180 may configure at least one of a communication module, a terminal, a pin, a cable, a port, a circuit, an element, or a device.

The power supply 190 may supply power to the vehicular firewall providing device 100. The power supply 190 may receive power from a power source (e.g., a battery) included in the vehicle 10 and may supply power to each unit of the advertisement providing device 100. The power supply 190 may be operated according to a control signal provided from the main ECU 240. The power supply 190 may be embodied as a switched-mode power supply (SMPS).

The processor 170 may be electrically connected to the memory 140, the interface unit 180, and the power supply 190 and may exchange a signal therewith. The processor 170 may be embodied using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or an electronic unit for performing other functions.

The processor 170 may be driven by power supplied from the power supply 190. The processor 170 may receive data, may process the data, may generate a signal, and may provide a signal in a state in which power is supplied by the power supply 190.

The processor 170 may receive information from other electronic devices within the vehicle 10 through the interface unit 180. The processor 170 may provide a control signal to other electronic devices within the vehicle 10 through the interface unit 180.

The processor 170 may match a data packet received from an external device and a plurality of rules at a set order. The external device may be any one of a server, other vehicles, and a terminal.

The plurality of rules may be made and set by a user. The plurality of rules may be generated based on an Internet protocol (IP) address and a port. The plurality of rules may include a black list rule and a white list rule. The black list rule may be generated based on an IP address and a port. The black list rule may be defined as a list of a data packet excluded from a processing target. The white list rule may be generated based on an IP address and a port. The white list rule may be defined as a list of a data packet included in a processing target.

The processor 170 may perform rule reordering of defining an order of a plurality of rules based on the matching result. For example, the processor 170 may position a largely used rule in front based on the matching result.

The processor 170 may perform rule reordering upon detecting a hacking attack sign. The processor 170 may detect the hacking attack sign based on an increase speed of data traffic. The processor 170 may detect the hacking attack sign based on the amount of increase in the number of data packet according to the preset plurality of rules.

When a hit count for the plurality of rules is satisfied, the processor 170 may perform rule reordering. For example, when a hit count for a first rule of the plurality of rules is satisfied, the processor 170 may perform rule reordering. In this case, the hit count may be defined as a number of times that a data packet matches the first rule. The processor 170 may calculate a hit count based on data that accumulates from the beginning. The processor 170 may calculate a hit count based on data that accumulates for recent several days. The processor 170 may calculate a hit count based on data that accumulates after the vehicle 10 is turned on.

The processor 170 may perform rule reordering at a preset period. For example, the processor 170 may perform rule reordering in units of one week.

The processor 170 may perform rule reordering when a matching rule is not present in a rule group that is recently used.

Upon detecting a hacking attack sign in a state in which the vehicle 10 autonomously travels, the processor 170 may perform rule reordering after an autonomous driving state is terminated. For example, when TLS Heartbleed attack occurs during autonomous driving, the processor 170 may perform rule reordering after autonomous driving that largely requires processing is stopped.

The processor 170 may perform rule reordering using machine learning information.

For example, when the vehicle 10 is positioned in a specific space (e.g., specific location), the processor 170 may determine that a plurality of hacking attacks occurs based on the accumulated data. In this case, when the vehicle 10 is positioned in a specific space, the processor 170 may perform rule reordering.

For example, the processor 170 may determine that a plurality of hacking attacks occurs in a specific time period based on the accumulated data. In this case, the processor 170 may perform rule reordering in a specific time period.

For example, the processor 170 may perform that periodic updating is performed at dawn. In this case, the processor 170 may perform rule reordering in regard to updating at a corresponding time.

The processor 170 may perform rule reordering while the vehicle 10 parks. The processor 170 may perform related rule reordering when a software update packet is received after the vehicle is turned off.

The processor 170 may perform related rule reordering corresponding to a related service (e.g., eCall) when a traffic accident of the vehicle 10 occurs.

The processor 170 may include a Kernel space 410 and a user space 420.

The Kernel space 410 may be defined as a space for executing a device driver. The Kernel space 410 may include a netfilter 412 and a first detector 411.

The netfilter 412 may rapidly filter a data packet based on the black list rule and the white list rule. The netfilter 412 may filter a data packet based on the black list rule and the white list rule according to a first requirement. For example, the netfilter 412 may filter a data packet based on the black list rule and the white list rule according to a continuous stream of an IP address, a port, and a payload.

The netfilter 412 may receive information on a filtering target from a packet handler 421. The netfilter 412 may exclude a data packet as a filtering target from a processing target.

The first detector 411 may rapidly filter a data packet using an eXpress data path (XDP). The first detector 411 may perform hooking on a data packet input to the netfilter 412. The first detector 411 may filter the data packet on which hooking is performed, based on the black list rule. The first detector 411 may filter the data packet, on which hooking is performed, based on the black list rule according to a second requirement that is different from the first requirement. For example, the first detector 411 may filter the data filter based on the black list rule according to an IP address and a port.

Upon detecting a hacking attack sign, the first detector 411 may be activated.

The user space 420 may be defined as a space in which an application is executed. Here, the application may be a firewall application. The user space may include a packet handler 421, a second detector 422, and a reordering 423.

The packet handler 421 may receive a data packet from the netfilter 412. The packet handler 421 may detect the data packet received from the netfilter 412. The packet handler 421 may provide information on a filtering target to the netfilter 412. The packet handler 421 may provide an action value of a specific packet to the netfilter 412.

The second detector 422 may select the data packet received through the packet handler 421 as a filtering target according to a third requirement different from the first requirement, based on the black list rule and the white list rule. For example, the second detector 422 may perform pattern matching on the data packet and a stream in a complex form of regular expression of an IP address, a port, and a payload based on the black list rule and the white list rule.

The reordering 423 may perform rule reordering. The reordering 423 may provide the reordered rule to the first detector 411 and the second detector 422. For example, the reordering 423 may provide the reordered black list rule to the first detector 411. For example, the reordering 423 may provide the reordered black list rule and white list rule to the second detector 422.

The processor 170 may perform reordering on the black list rule used in the user space 420.

The processor 170 may perform reordering on the white list rule used in the user space 420.

Upon detecting a hacking attack sign, the processor 170 may activate the first detector 411.

The processor 170 may perform reordering on the black list rule used in the Kernel space 410.

The processor 170 may perform reordering on the black list rule used in the Kernel space 410 based on the matching result of the data packet in the user space 420 and the black list rule.

The vehicular firewall providing device 100 may include at least one printed circuit board (PCB). The memory 140, the interface unit 180, the power supply 190, and the processor 170 may be electrically connected to the PCB.

Figure 5:
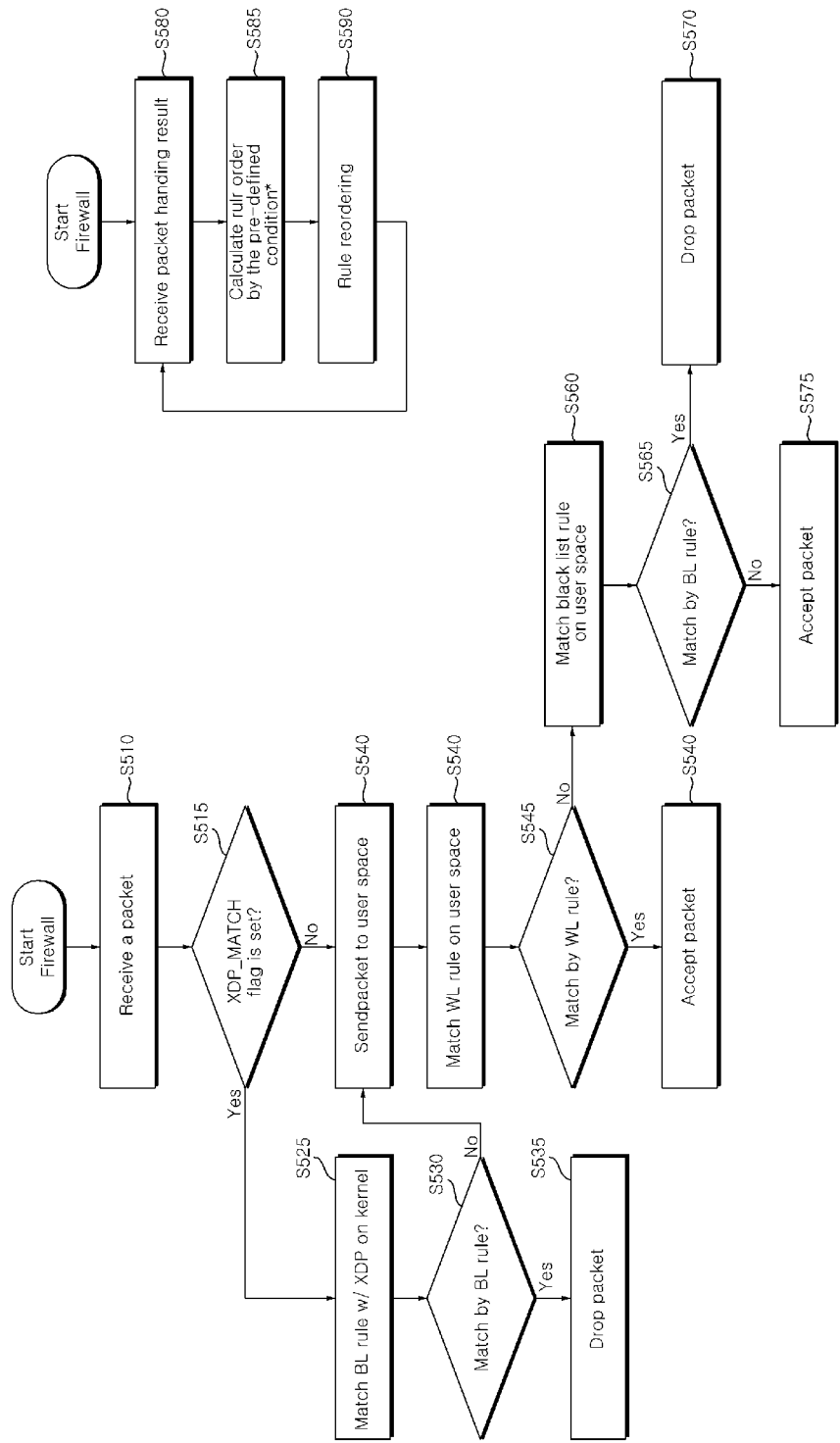
FIG. 5 is a diagram for explanation of an operation of a vehicular firewall providing device according to an embodiment of the present invention.

FIG. 5 is a diagram for explanation of an operation of a vehicular firewall providing device according to an embodiment of the present invention.

Referring to FIGS. 4 and 5, the processor 170 may receive a packet (S510). The processor 170 may determine whether an XDP match flag is set (S515). Most packets are normal, and thus when XDP matching is performed on all packets, much processing load is caused. The XDP flag is set, and thus when a hacking attack sign is detected, XDP may be performed on the packet.

When the XDP match flag set is satisfied, the processor 170 may match a packet in the Kernel space 410 and the black list rule (S525).

Upon determining that the packet matches the black list rule (S530), the processor 170 may drop the packet (S535).

In operation S515, when the XDP mat flag set is not satisfied, the processor 170 may transmit a packet to the user space 420 (S540).

In operation S530, upon determining that the packet does not match the black list rule, the processor 170 may transmit the packet to the user space 420 (S540).

The processor 170 may match the packet in the user space 420 and the white list rule (S545).

Upon determining that the packet matches the white list rule (S550), the processor 170 may accept the packet.

Upon determining that the packet does not match the white list rule (S550), the processor 170 may match the packet in the user space 420 and the black list rule (S560).

Upon determining that the packet matches the black list rule (S565), the processor 170 may drop the packet (S570).

Upon determining that the packet does not match the black list rule (S565), the processor 170 may accept the packet.

When reordering begins, the processor 170 may receive the packet handling result (S580).

The processor 170 may calculate an order of rules according to a predefined condition (S585).

The processor 170 may reorder rules (S590).

FIGS. 6 to 9 are diagrams for explanation of a rule reordering operation of a vehicular firewall providing device according to an embodiment of the present invention. Hereinafter, an application is a firewall application.

Figure 6:
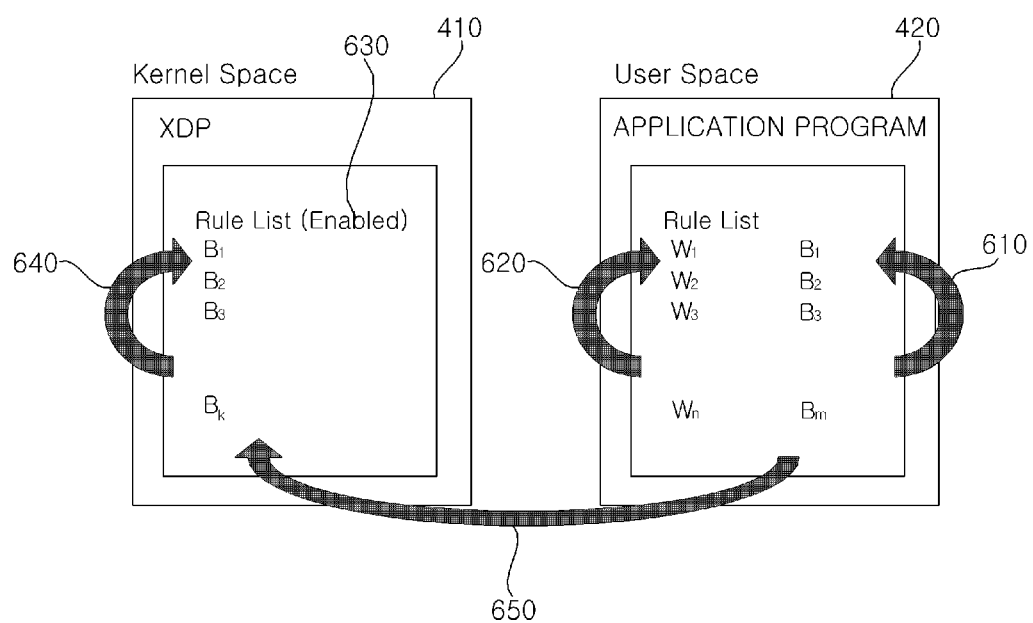
FIGS. 6 to 9 are diagrams for explanation of a rule reordering operation of a vehicular firewall providing device according to an embodiment of the present invention.

Referring to FIG. 6, the processor 170 may reorder a black list rule in an application (or a user space) (610). For example, the processor 170 may match a packet and the black list rule in the application. Upon detecting a packet that matches the first rule of the black list rule, the processor 170 may preferentially reorder the first rule in the application.

The processor 170 may reorder the white list rule in the application (or a user space) (620). For example, the processor 170 may match the packet and the white list rule in the application. Upon detecting the packet that matches the first rule of the white list rule, the processor 170 may preferentially reorder the first rule in the application.

The processor 170 may activate the black list rule in XDP (or a Kernel space) (630). Upon detecting hacking attack, the processor 170 may activate the black list rule in the XDP. In this case, the XDP may perform hooking on the packet input to the netfilter 412 and may match the packet, on which hooking is performed, and the black list rule.

The processor 170 may reorder the black list rule in the XDP (or a Kernel space) (640). For example, the processor 170 may match the packet and the black list rule, in the XDP. Upon detecting the packet that matches the first rule of the black list rule, the processor 170 may preferentially reorder the first rule in the XDP.

The processor 170 may reorder the black list rule in the XDP (or a Kernel space) based on the matching result of the packet in the application (or a user space) and the black list rule (650). For example, the processor 170 may match the packet and the black list rule, in the application. Upon detecting the packet that matches the first rule of the black list rule, the processor 170 may preferentially reorder the first rule in the XDP.

Figure 7:
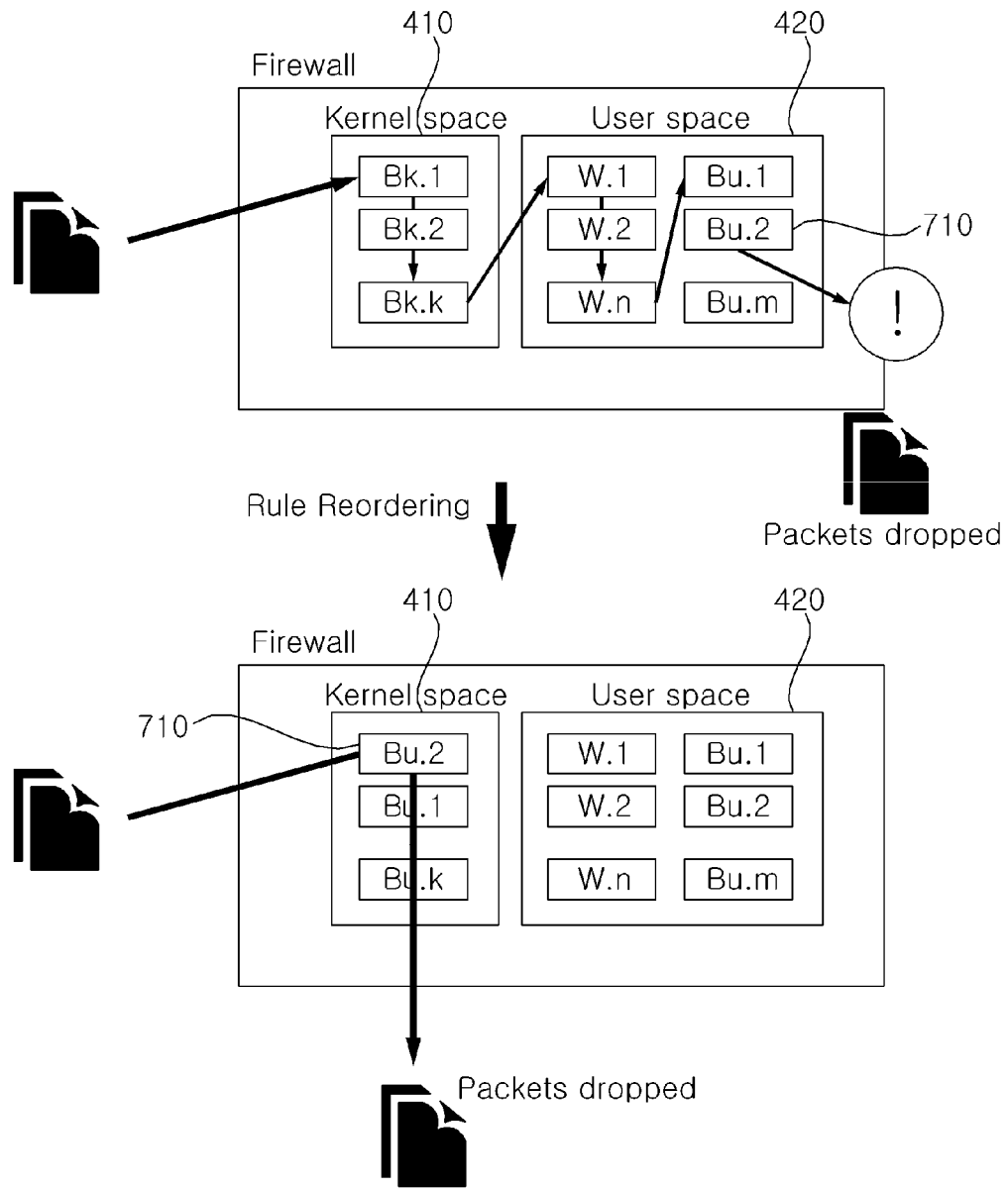

Referring to FIG. 7, DoS/DDoS attack may be detected by a specific rule 710 included in the black list rule in the firewall application of the user space 420.

The processor 170 may activate the black list rule of the Kernel space 410.

The processor 170 may swap a rule with a lowest probability that the rule is sued in the black list rule of the XDP with the specific rule 710 that detects the DoS/DDoS attack in the user space.

DoS/DDoS packets that are generated thereafter may be rapidly detected by the specific rule 710 that is the black list rule of the XDP and may be dropped.

The specific rule 710 that is a rule for detecting the DoS/DDoS attack may be one rule but may also be a rule group (a rule group for DoS/DDoS). The rule reordering method may be reordering for each rule or may also be reordering of rule groups.

Figure 8:
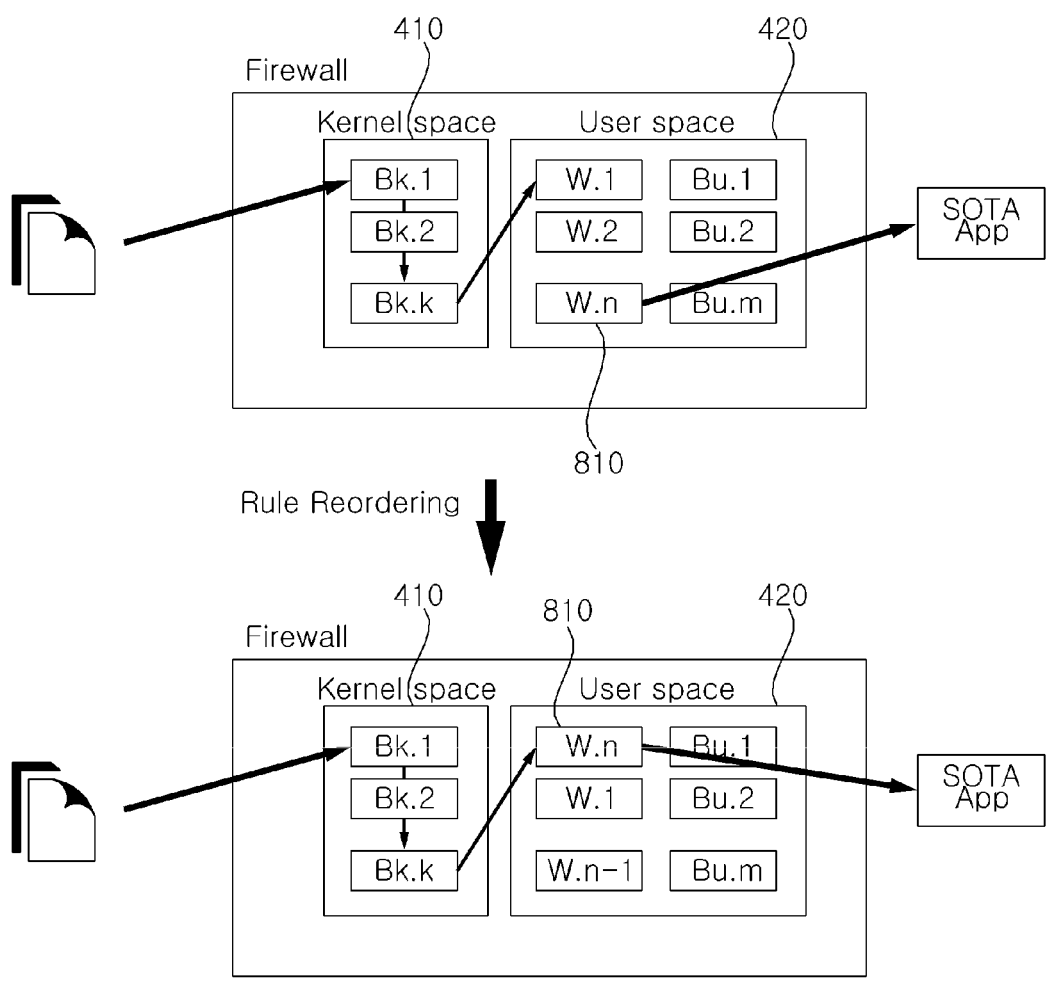

Referring to FIG. 8, software update over the air (SOTA) traffic may be detected by a specific rule 810 included in the white list rule of the firewall application of the user space 420. The SOTA traffic may be traffic in which a large amount of data is transmitted.

The processor 170 may execute white list rule reordering by preferentially reordering the specific rule 810.

SOTA traffic that is generated thereafter may be rapidly processed by the specific rule 810 that is disposed in front.

The specific rule 810 that is a rule for detecting SOTA traffic may be one rule, but may also be a rule group (a rule group for detecting SOTA traffic). A rule reordering method may be reordering for each rule or may also be reordering of rule groups.

Figure 9:
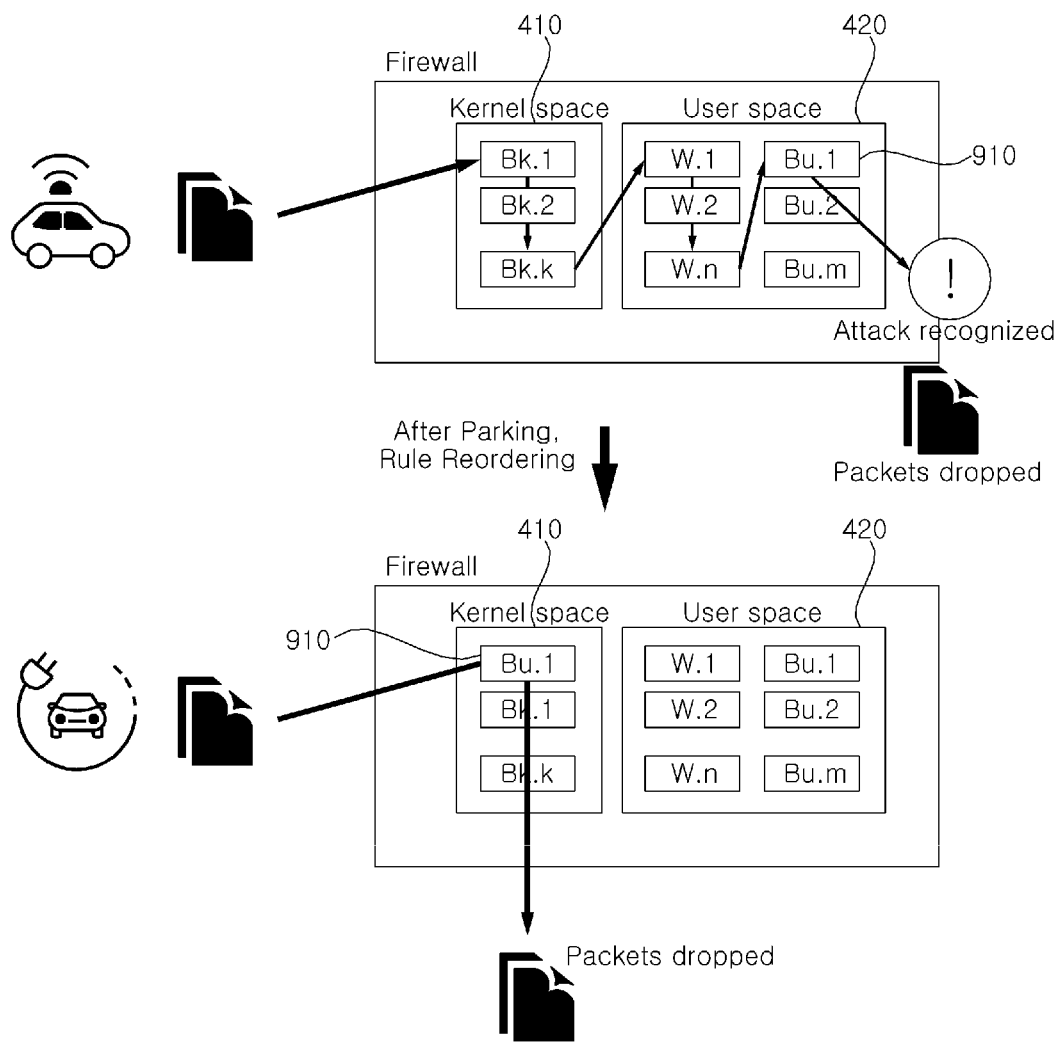

Referring to FIG. 9, abnormal traffic may be generated by security attack while the vehicle 10 autonomously travels. In this case, HTTP abnormal traffic may be detected by a specific rule 910 of the black list rule in the user space.

The vehicle 10 autonomously travels, and thus it may be seen that a resource such as CPU/Memory is greater than a reference.

The processor 170 may delay rule reordering until autonomous driving is terminated.

After parking, when autonomous driving is terminated, the processor 170 may examine the generated attacks and may perform XDP black list rule reordering.

HTTP abnormal traffics that are generated thereafter may be rapidly detected by the specific rule 910 that is the black list rule of the XDP and may be dropped.

The specific rule 910 that is a rule for detecting HTTP abnormal traffic may be one rule, but may also be a rule group (a rule group for detecting HTTP abnormal traffic). A rule reordering method may be reordering for each rule or may also be reordering of rule groups.

The invention can also be embodied as computer readable code on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), ROM, RAM, CD-ROM, magnetic tapes, floppy disks, optical data storage devices, etc. and include a carrier wave (for example, a transmission over the Internet). In addition, the computer may include a processor or a controller. Accordingly, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed:

1. A vehicular firewall providing device comprising:
a processor configured to match a data packet received from an external device and a plurality of rules at a set order, and perform rule reordering defined to change the order based on a result of the matching of the data packet,
wherein, upon detecting a hacking attack sign in a state in which a vehicle autonomously travels, the processor is configured to perform the rule reordering after the state, in which the vehicle autonomously travels, is terminated.

2. The vehicular firewall providing device of claim 1, wherein the plurality of rules include:
a black list rule generated based on an Internet protocol (IP) address and a port, and defined as a list of a data packet excluded from a processing target; and
a white list rule generated based on an IP address and a port, and defined as a list of a data packet included in the processing target.

3. The vehicular firewall providing device of claim 1, wherein the processor is configured to perform the rule reordering when a hit count for a first rule of the plurality of rules is satisfied, and
wherein the hit count is defined as a number of times that a data packet matches the first rule.

4. The vehicular firewall providing device of claim 1, wherein the processor is configured to perform the rule reordering when a vehicle is positioned in a specific location.

5. The vehicular firewall providing device of claim 2, wherein the processor is configured to include:
a Kernel space defined as a space for executing a device driver; and
a user space defined as a space in which an application is executed.

6. The vehicular firewall providing device of claim 5, wherein the Kernel space includes:
a netfilter configured to filter a data packet based on the black list rule and the white list rule according to a first requirement; and
a first detector configured to perform hooking on a data packet input to the netfilter.

7. The vehicular firewall providing device of claim 6, wherein the first detector filters the data packet, on which hooking is performed based on the black list rule, according to a second requirement different from the first requirement.

8. The vehicular firewall providing device of claim 6, wherein the user space includes:
a packet handler configured to receive a data packet from the netfilter;
a second detector configured to select a data packet received through the packet handler as a filter target according to a third requirement different from the first requirement based on the black list rule and the white list rule; and
a reordering configured to perform rule reordering and to provide a reordered rule to the first detector and the second detector.

9. The vehicular firewall providing device of claim 8, wherein the packet handler provides information on the filtering target to the netfilter; and
wherein the netfilter excludes the data packet as the filtering target from the processing target.

10. The vehicular firewall providing device of claim 5, wherein the processor is configured to perform reordering on a black list rule used in the user space.

11. The vehicular firewall providing device of claim 5, wherein the processor is configured to perform reordering on a white list rule used in the user space.

12. The vehicular firewall providing device of claim 6, wherein, upon detecting a hacking attack sign, the processor is configured to activate the first detector.

13. The vehicular firewall providing device of claim 5, wherein the processor is configured to perform reordering on a black list rule used in the Kernel space.

14. The vehicular firewall providing device of claim 5, wherein the processor is configured to perform reordering on a black list rule used in the Kernel space based on a matching result of a data packet in the user space and the black list rule.

15. A vehicular firewall providing device comprising:
a processor configured to match a data packet received from an external device and a plurality of rules at a set order, and perform rule reordering defined to change the order based on a result of the matching of the data packet,
wherein the processor is configured to perform the rule reordering when a vehicle is positioned in a specific location.

16. The vehicular firewall providing device of claim 15, wherein the processor is configured to include a Kernel space defined as a space for executing a device driver, and
wherein the Kernel space includes:
a netfilter configured to filter a data packet based on a black list rule and a white list rule according to a set requirement; and
a first detector configured to perform hooking on a data packet input to the netfilter.

17. A vehicular firewall providing device comprising:
a processor configured to match a data packet received from an external device and a plurality of rules at a set order, and perform rule reordering defined to change the order based on a result of the matching of the data packet,
wherein the plurality of rules include:
- a black list rule generated based on an Internet protocol (IP) address and a port, and defined as a list of a data packet excluded from a processing target; and
- a white list rule generated based on an IP address and a port, and defined as a list of a data packet included in the processing target, wherein the processor is configured to include:
- a Kernel space defined as a space for executing a device driver; and
- a user space defined as a space in which an application is executed, and wherein the processor is configured to perform reordering on a black list rule or a white list rule used in the user space.

* * * * *